(12) United States Patent
Sathya et al.

(10) Patent No.: US 10,685,078 B2
(45) Date of Patent: Jun. 16, 2020

(54) CONTENT PROVISION BASED ON GEOGRAPHIC PROXIMITY

(71) Applicant: Facebook, Inc., Menlo Park, CA (US)

(72) Inventors: Sai Sri Sathya, Tamil Nadu (IN); Shashank Bharath, Mountain View, CA (US); Ramesh Raskar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 15/863,616

(22) Filed: Jan. 5, 2018

(65) Prior Publication Data

US 2019/0213266 A1 Jul. 11, 2019

(51) Int. Cl.
| | | |
|---|---|---|
| *G06F 16/20* | (2019.01) | |
| *G06F 16/9537* | (2019.01) | |
| *G06F 16/29* | (2019.01) | |
| *G06F 16/248* | (2019.01) | |
| *G06F 16/9535* | (2019.01) | |
| *G06F 16/2457* | (2019.01) | |

(52) U.S. Cl.
CPC ........ *G06F 16/9537* (2019.01); *G06F 16/248* (2019.01); *G06F 16/24575* (2019.01); *G06F 16/24578* (2019.01); *G06F 16/29* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 9,392,314 | B1* | 7/2016 | Lewis | H04N 21/2668 |
| 2014/0012925 | A1* | 1/2014 | Narayanan | G06Q 10/109 |
| | | | | 709/206 |
| 2016/0358065 | A1* | 12/2016 | Gedge | G06N 3/006 |
| 2018/0367483 | A1* | 12/2018 | Rodriguez | H04L 51/046 |

* cited by examiner

*Primary Examiner* — Jau Shya Meng
(74) *Attorney, Agent, or Firm* — Baker Botts L.L.P.

(57) ABSTRACT

A method includes detecting a proximity event associated with a first user and a second user, wherein the proximity event includes the second user being in geographic proximity to the first user and calculating an influence score associated with the proximity event, wherein the influence score is based at least in part on a social gravity of the second user and a duration of the proximity event. The method further includes, upon determining that the influence score is greater than a threshold score, identifying, based at least in part on a geographic location of the first user, a content object associated with the second user for provision to the first user and sending the content object to a client system associated with the first user for display.

20 Claims, 5 Drawing Sheets

CONTENT PROVISION BASED ON GEOGRAPHIC PROXIMITY

TECHNICAL FIELD

This disclosure generally relates to provision of content to users of a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may provide content to a user based on the use's proximity to one or more other users or entities associated with the social-networking system. The social-networking system may use a content-targeting model to identify content to be recommended or provided to particular users. The content-targeting model may determine relevance of particular content to a particular user based on one or more user attributes including, for example, one or more individual interests, a social gravity, a current or past geographic location, one or more intent signals, other suitable user attributes, or any combination thereof. In particular embodiments, a first user's interest in content may be influenced by a second user or an entity, to which the first user gets in geographic proximity. Here, each instance that the first user gets in geographic proximity to a second user or an entity may be called a "proximity event." The first user or the influenced user may be called a "puller." The second user or the entity, which have influenced the first user, may be called a "pusher." In a particular proximity event, a user may influence or be influenced by another user at the same time. Particular embodiments disclosed herein may introduce a user's geographic proximity to one or more other users or entities as an additional signal to the content-targeting model. This additional signal may improve the ability of the content-targeting model to identify content that a particular user is likely to develop an interest in, to review, or to interact with. Particular embodiments disclosed herein may enhance one or more location-based services of the social-networking system by, for example, interfacing one or more users' geographic proximity in the real world, as detected or reported by their client systems, with their relationships and connections on the online social network, as maintained by the social-networking system.

In particular embodiments, the social-networking system may first detect a proximity event associated with a first user and a second user. The proximity event may comprise the second user being in geographic proximity to the first user. Upon detection of the proximity event, the social-networking system may further gather information associated with a nature of the proximity event, the identity of the second user, who may be a pusher associated with the proximity event, one or more attributes of the second user, a duration of the proximity event, a frequency of similar proximity events between the first user and the second user, other suitable factors, or any combination thereof. The social-networking system may then calculate an influence score associated with the proximity event. The influence score may quantify an extent to which an interest of the first user is likely to be influenced by the proximity event. The influence score may be based at least in part on a social gravity of the second user or a duration of the proximity event. It may be based on one or more other factors. The social-networking system may then determine if the influence score is greater than a threshold score. If so, the social-networking system may identify, based at least in part on a geographic location of the first user, a content object associated with the second user for provision to the first user. The social-networking system may then send the content object to a client system associated with the first user for display. On the other hand, if the calculated influence score is smaller than the threshold score, the social-networking system may refrain from sending the identified content object to the first user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
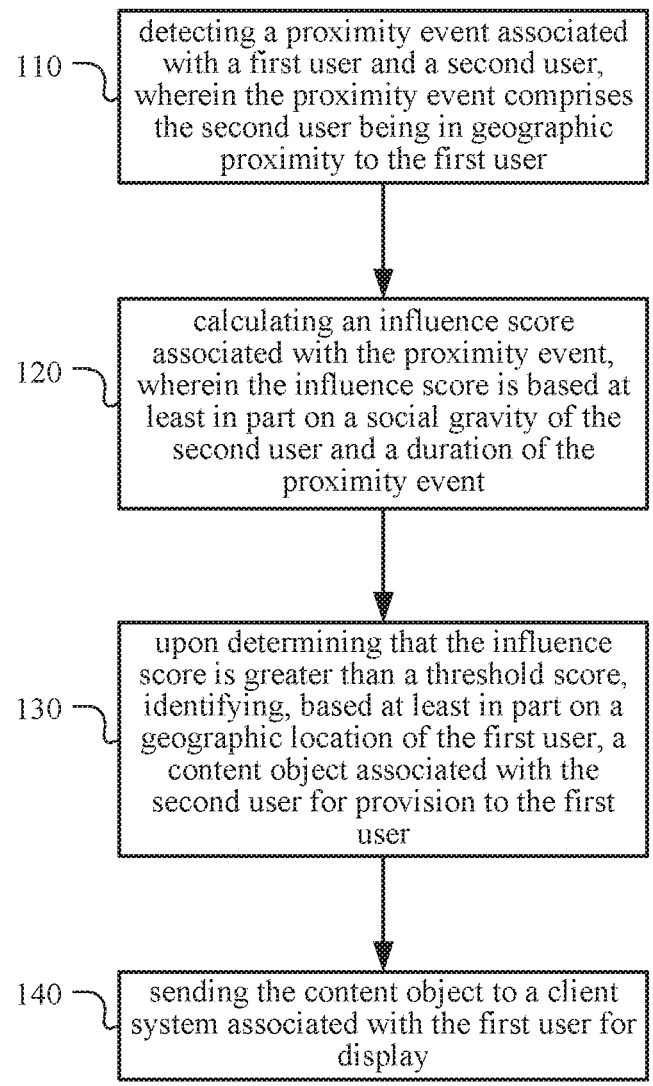
FIG. 1 illustrates an example method for providing content to a user based on geographic proximity.

In particular embodiments, the social-networking system may provide content to a user based on the use's proximity to one or more other users or entities associated with the social-networking system. The social-networking system may use a content-targeting model to identify content to be recommended or provided to particular users. The content-targeting model may determine relevance of particular content to a particular user based on one or more user attributes including, for example, one or more individual interests, a social gravity, a current or past geographic location, one or more intent signals, other suitable user attributes, or any combination thereof. In particular embodiments, a first user's interest in content may be influenced by a second user or an entity, to which the first user gets in geographic proximity. Here, each instance that the first user gets in geographic proximity to a second user or an entity may be called a "proximity event." The first user or the influenced user may be called a "puller." The second user or the entity, which have influenced the first user, may be called a "pusher." In a particular proximity event, a user may influence or be influenced by another user at the same time. Particular embodiments disclosed herein may introduce a user's geographic proximity to one or more other users or entities as an additional signal to the content-targeting model. This additional signal may improve the ability of the content-targeting model to identify content that a particular user is likely to develop an interest in, to review, or to interact with. Particular embodiments disclosed herein may enhance one or more location-based services of the social-networking system by, for example, interfacing one or more users' geographic proximity in the real world, as detected or reported by their client systems, with their relationships and connections on the online social network, as maintained by the social-networking system.

In particular embodiments, the social-networking system may first detect a proximity event associated with a first user and a second user. The proximity event may comprise the second user being in geographic proximity to the first user. Upon detection of the proximity event, the social-networking system may further gather information associated with a nature of the proximity event, the identity of the second user, who may be a pusher associated with the proximity event, one or more attributes of the second user, a duration of the proximity event, a frequency of similar proximity events between the first user and the second user, other suitable factors, or any combination thereof. The social-networking system may then calculate an influence score associated with the proximity event. The influence score may quantify an extent to which an interest of the first user is likely to be influenced by the proximity event. The influence score may be based at least in part on a social gravity of the second user or a duration of the proximity event. It may be based on one or more other factors. The social-networking system may then determine if the influence score is greater than a threshold score. If so, the social-networking system may identify, based at least in part on a geographic location of the first user, a content object associated with the second user for provision to the first user. The social-networking system may then send the content object to a client system associated with the first user for display. On the other hand, if the calculated influence score is smaller than the threshold score, the social-networking system may refrain from sending the identified content object to the first user.

In particular embodiments, a content object identified by the social-networking system and sent to a client system associated with a user may comprise, for example, a profile page, a post, a news story, an instant message, a chat room conversation, an email, an advertisement, a picture, a video, an audio item, another suitable content object, or any combination thereof. In case the content object comprises an advertisement, the content-targeting model may be used by or in conjunction with an advertisement-targeting service that facilitates the delivery of advertisements to users that are more likely to find the advertisements relevant or useful. The advertisement targeting may be directed to users' news feeds, search results, e-mail or other in-boxes, or other notification channels. The advertisement targeting service may use a plurality of targeting criteria including, for example, explicit or implicit user interests or connections, social gravities of users, geographic locations, intent signals, social-graph information, events information, other suitable criteria, or any combination thereof. In particular embodiments, the advertisement-targeting service may identify an intent of a particular user with respect to a particular product or service based on various sources of data. The intent may comprise a research and explore intent, a consideration intent, a purchase intent, or another suitable intent. The social-networking system may match an advertisement associated with a particular product or service based on a user's intent with respect to the same.

In particular embodiments, a user's intent with respect to a particular product or service may be influenced by the user's proximity to another user or an entity. The entity may comprise a business, a service provider, a brand, an agency, an organization, or another suitable type of entity with advertising needs. The entity may be represented by a node in a social graph associated with the social-networking system. The social-networking system may store various information associated with the entity. A proximity event may impact user-advertisement interactions and may therefore be introduced as a factor or criteria considered by the advertisement-targeting service to improve relevance of advertisements presented to a recipient. As an example and not by way of limitation, if a first user was in proximity to a second user for a particular duration and the second user has a particular intent with respect to a particular product or service, the advertisement-targeting service may infer that the first user may have developed a same or different intent with respect to the product or service by virtue of spending time with the second user. The social-networking system may determine whether the second user is likely to have influenced the first user based at least in part on a social gravity of the second user. For example, the social-networking system may determine that a user Alice has had a meeting with another user Bob, who is considering a vacation in Bali or in Hawaii. The social-networking system may recognize Bob's consideration intent with respect to both vacation destinations, determine that Bob is likely to have influenced Alice during the meeting (e.g., by talking about his vacation plan), and push an advertisement related to a vacation in Bali or Hawaii to Alice. More information on targeting advertisements based on location information may be found in U.S. patent application Ser. No. 14/565,369, filed 9 Dec. 2014, which is incorporated by reference.

FIG. 1 illustrates an example method 100 for providing content to a user based on geographic proximity. The method may begin at step 110, where the social-networking system may detect a proximity event associated with a first user and a second user. The proximity event may comprise the second user being in geographic proximity to the first user. While detecting the proximity event, the social-networking system may gather various information associated with the proximity event including, for example, a nature of the proximity event, the identity of the first user or the second user, one or more attributes of the first user or the second user, a duration of the proximity event, a frequency of similar proximity events between the first user and the second user, other suitable factors, or any combination thereof.

In particular embodiments, the proximity event may be detected based on data gathered by one or more client systems associated with the first user or the second user and sent to the social-networking system. In particular embodiments, a client system associated with a particular user may comprise one or more network adaptors and transceivers and one or more sensors including, for example, a microphone, a camera, a touch sensor, an accelerometer, a gyroscope, a magnetometer, a GPS receiver, or another suitable sensor. The network devices and sensors may be used to collect data for determining a user is in proximity with another. As an example and not by way of limitation, the social-networking system may compare GPS signals from two client systems and determine that the geographic locations identified by the GPS signals are close to each other. The social-networking system may thereby determine that the owners of the client systems are in geographic proximity to each other. As another example and not by way of limitation, a client system may be connected to a Wi-Fi network having a particular access point. The client system may obtain an IP address of the wireless access point and send it to the social-networking system. The social-networking system may determine that the user of this client system is in geographic proximity with another user, whose client system reports a same access point IP address. As yet another example and not by way of limitation, the social-networking system may receive audio recordings by microphones associated with two client systems and determine the records have a same and synchronized piece of background music. The social-networking system may determine that the users associated with the two client systems are in geographic proximity to each other based on this information.

In particular embodiments, the social-networking system may also detect one or more physical interactions between the first user and the second users based on data received from their client systems. The physical interactions may include conversations, handshakes, hands waving, or any suitable human interactions. As an example and not by way of limitation, a camera on a client system may capture a photograph showing both users and send the photograph to the social-networking system. The social-networking system may analyze the photograph and determine that the users were shaking hands. It may accordingly infer that the proximity event comprises the users having a friendly conversation.

In particular embodiments, the social-networking system may detect a proximity event associated with a user and an entity. The proximity event may comprise the user being geographic proximity to a location associated with the entity. The entity may comprise a business, a service provider, a brand, an agency, an organization, or another suitable type of entity. The entity may be associated with one or more different physical locations such as a store, an office, a headquarter, a sponsored landmark, another suitable physical location, or any combination thereof. The user going nearby any physical location of an entity may constitute a proximity event between the user and the entity. The proximity event may be identified based on data gathered by one or more sensors of the user's client system. As an example and not by way of limitation, the social-networking system may receive GPS data from the client system indicating a user's current latitudinal and longitudinal coordinates. The social-networking system may determine that coordinates overlaps the range of latitudinal and longitudinal coordinates Levi's Stadium, which is associated with both the entity San Francisco 49ers (a professional football team) and the entity Levi Strauss & Co. (a clothing company). The social-networking system may identify a proximity event of the user with either of the two entities. Although this disclosure describes detecting particular events associated with particular users or entities in a particular manner, this disclosure contemplates identifying any suitable events associated with any suitable users or entities in any suitable manner.

At step 120, the social-networking system may calculate an influence score associated with the detected proximity event. The influence score may be based at least in part on a social gravity of the second user or the entity, to which the first user was in proximity, and a duration of the proximity event. Within a social graph associated with the social-networking system, a social gravity may measure the "impact" a node has on its surroundings. It approximates the amount of influence a node has on the social graph based on the amount of attention paid to it by its surroundings. The social gravity of a user or an entity may be defined as the social gravity of the node representing the user or entity in the social graph. A node's social gravity may be calculated based on an inverse coefficient and a number of active connections. The inverse coefficient may be valued as a median of the inbound affinity coefficient ranks of one or more users toward the node of interest. The number of active connections may correspond to a count of the number of users whose affinity coefficient ranks are considered in calculating the inverse coefficient. The social gravity may be based on one or more other factors. The factors may be combined in a weighed manner and normalized to result in the social gravity value. The weights assigned to each factor may be constantly re-trained. As an example and not by way of limitation, the social gravity of the second user may be based at least in part on a count of third users who are connected to the second user on the social-networking system, a history of interactions between the second user and one or more of the third users, or a history of observations of a profile associated with the second user by one or more of the third users. In particular embodiments, a node may have a dynamic social-gravity value that ranges between, for example, 0 and 10. More information on social gravity may be found in U.S. patent application Ser. No. 15/490,023, filed 18 Apr. 2017, U.S. patent application Ser. No. 15/365, 609, filed 30 Nov. 2016, U.S. patent application Ser. No. 14/947,331, filed 20 Nov. 2015, U.S. patent application Ser. No. 13/688,015, filed 28 Nov. 2012, and U.S. patent application Ser. No. 13/688,020, filed 28 Nov. 2012, which are incorporated by reference.

In particular embodiments, the influence score of a proximity event involving the first user and the second user may be calculated further based at least in part on an affinity coefficient between the first user and the second user, a similarity between the first user and the second user; a frequency of one or more prior proximity events associated with the first user and the second user, or a conversion rate associated with one or more prior proximity events associated with the first user and the second user. The influence score of a proximity event involving the first user and another entity may be calculated based on similar factors. As an example and not by way of limitation, the social-networking system may detect a proximity event associated with Alice and Bob. The social-networking system may determine that Bob has a social gravity value in the top twenty-five percentile of all users of the social-networking system. Bob may also have a high affinity coefficient with Alice as they are close friends in real life and interact frequently on the online social network. The social-networking system may thereby calculate for this proximity event an influence score that is greater than a threshold score and may send a content object associated with Bob to Alice. In contrast, the social-networking system may also detect a proximity event associated with Alice and a salesperson Charlie. However, Alice and Charlie may have a low affinity coefficient with each other as they do not otherwise know each other. The social-networking system may calculate a below-threshold influence score for the proximity event and may not send any content object related to Charlie to Alice. As another example and not by way of limitation, the social-networking system may detect a proximity event between Alice and Daisy and may retrieve one or more prior proximity events between the two users. Alice and Daisy may have had ten prior proximity events as they often hang out with each other. The social-networking system may have sent a content object associated with Daisy to Alice after five of the ten prior proximity events. For four out of the five times, Alice interacted with the targeted content in some manner. The social-networking system may calculate a conversion rate of 80% for proximity events between Alice and Daisy. Based on this high conversion rate, the social-networking system may calculate a high influence score this time and send a content object associated with Daisy to Alice. Although this disclosure describes calculating a particular score in a particular manner, this disclosure contemplates calculating any suitable score in any suitable manner.

At step 130, upon determining that the influence score is greater than a threshold score, the social-networking system may identify a content object associated with the second user for provision to the first user. Alternatively, if the proximity event is between the first user and an entity, the social-networking system may identify a content object associated with the entity for provision to the first user. The content object may be identified based at least in part on a geographic location of the first user. In particular embodiments, the social-networking system may determine an intent of the first user and identify the content object based at least in part on the intent. As an example and not by way of limitation, the social-networking system may detect that a first user have met and chatted with a second user for half an hour and calculate an above-threshold influence score for this proximity event. The social-networking system may then determine that the second user have purchased a ticket to watch a particular movie, thus has a purchase intent toward the movie. Based on the second user's intent and the proximity event between the first user and the second user, the social-networking system may infer that the first user developed a consideration intent toward the movie. After the proximity event, the first user may walk nearby a movie theatre showing the movie. The social-networking system may identify, based on the first user's intent and geographic location, an advertisement associated with the movie and deliver it to the first user.

In particular embodiments, the identified content object may be associated with a product or service used by the second user. As an example and not by way of limitation, the social-networking system may detect a proximity event between Alice and Bob and may calculate an above-threshold influence score for the proximity event. The social-networking system may determine that the proximity event comprises Bob giving Alice a ride based on their location information. The social-networking system may access profile information of Bob and determine that Bob drives a car of a brand A, which was likely used to give Alice a ride, and identify an advertisement of brand A for provision to Alice.

In particular embodiments, the content object may have been created by an entity associated with the social-networking system. The content object may be related to the second user because the second user was in geographic proximity to a physical location of the entity prior to the proximity event. Alternatively or additionally, the content object may be related to the second user because a node corresponding to the entity in the social graph is connected to a node corresponding to the second user by an edge. As an example and not by way of limitation, the social-networking system may detect a proximity event between Alice and Bob and may calculate an above-threshold influence score for the proximity event. Bob may have spent time at a shoe store of a brand B for a while before Bob meets Alice. The social-networking system may determine that Bob has developed an interest in the brand B by spending time in the store and he may share this interest with Alice. The social-networking system may therefore provision a content object associated with the brand B to Alice even if Alice was not in geographic proximity to the shoe store. In this example, Bob is treated as a "relay" between the pusher brand B and the puller Alice. As illustrated by this example, the social-networking system may identify a content object for provision to a user based on more than one proximity events involving one or more other users.

At step 140, the social-networking system may send the content object to a client system associated with the first user for display. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for providing content to a user based on geographic proximity including the particular steps of the method of FIG. 1, this disclosure contemplates any suitable method for providing content to a user based on geographic proximity including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In particular embodiments, the social-networking system may identify one or more third users in geographic proximity to the first user and analyze a mobility pattern of the third users to identify a hotspot location. The social-networking system may then sending a content object associated with the hotspot location to the client system associated with the first user for display. As an example and not by way of limitation, a first user may be shopping on a busy street. The social-networking system may detect a number of other users in proximity to the first user and also that a large proportion of the surrounding users are located at or moving toward a particular store. The social-networking system may identify the location of the store as a hotspot location and send the first user a content object associated with the store. In this case, even if the users surrounding the first user do not have high social gravity values or affinity coefficients with the first user, the social-networking system may still target a content based on their behavior due to their large number.

Figure 2:
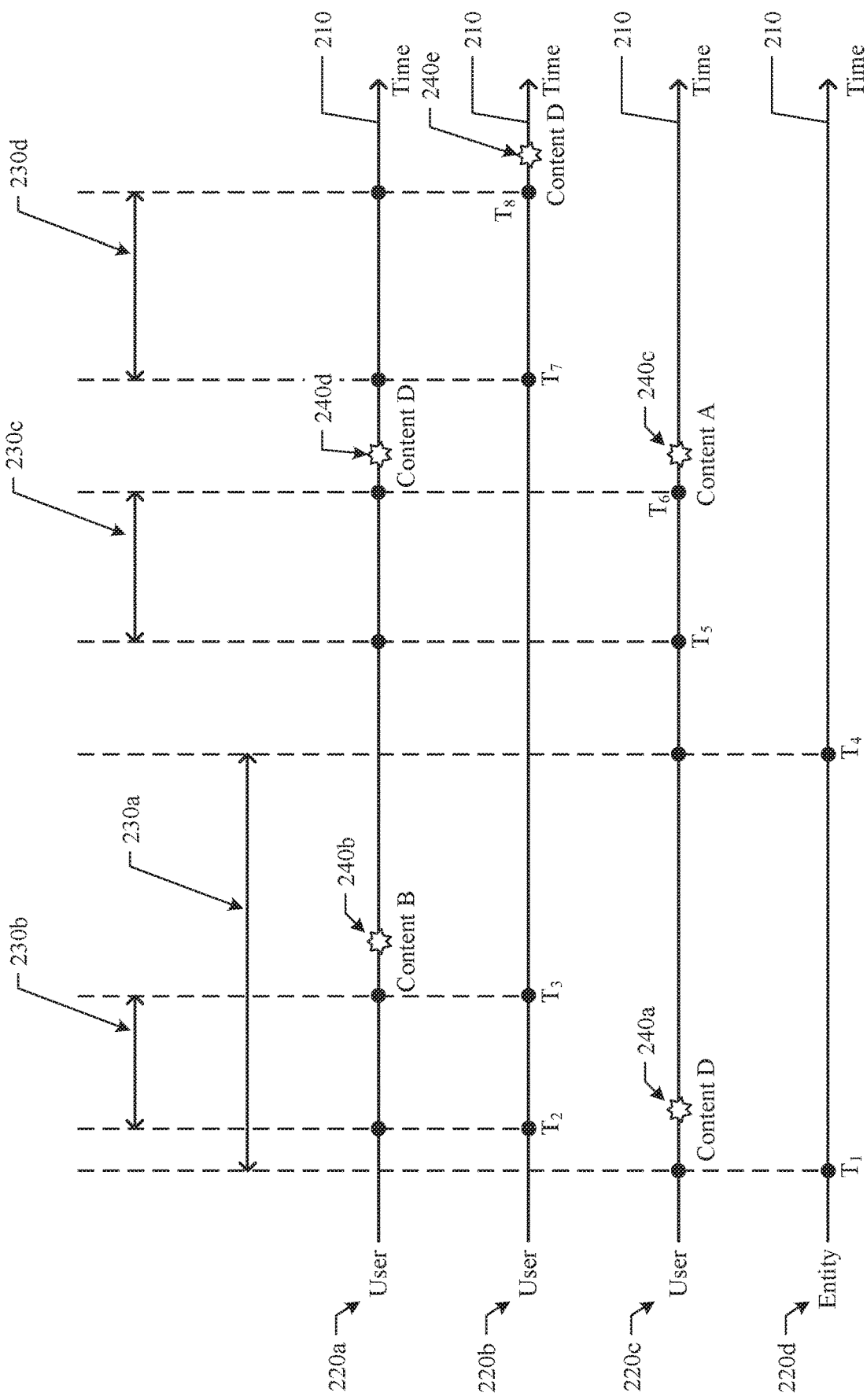
FIG. 2 illustrates a timeline of example proximity events.

FIG. 2 illustrates a timeline of example proximity events. As illustrated in FIG. 2, a time axis 210 is used to illustrate the activities at different time points for each of three users 220a, 220b, and 220c and an entity 220d (e.g., a store for a particular brand). Each solid dot on the time axis 210 corresponds to a time point and indicates an event involving the corresponding user or entity. At time $T_1$, the user 220c may come in proximity to the entity 220d. The user 220c may stay close to the entity 220d until $T_4$. The period between $T_1$ and $T_4$ may define a proximity event 230a between the user 220c and the entity 220d. The social-networking system may detect this proximity event 230a and calculate an above-threshold influence score for this proximity event 230a after the user 220c spend a certain amount of time in proximity to the entity 220d. The social-networking system may send 240a a content object associated with the entity 220d to the user 220c. At time $T_2$, the user 220a and the user 220b may come in proximity to each other. The meeting of the user 220a and the user 220b may last until the time $T_3$. The period between $T_2$ and $T_3$ may define a proximity event 230b between the user 220a and the user 220b. The social-networking system may calculate an influence score of the proximity event 230b for the user 220a. The influence score may be based on a social gravity of the user 220b and a duration of the proximity event 230b. This influence score may be greater than the threshold score. So the social-networking system may send 240b a content object associated with the user 220b to the user 220a. The social-networking system may calculate an influence score of the proximity event 230b for the user 220b. The influence score may be based on a social gravity of the user 220a and a duration of the proximity event 230b. This influence score may be smaller than the threshold score because the user 220a has a smaller social gravity value than the user 220b. So the social-networking system may not send any content object associated with the user 220a to the user 220b.

After the proximity events 230a and 230b, the user 220a and the user 220c may have a proximity event 230c between time points $T_5$ and $T_6$. The social-networking system may calculate two influence scores for this proximity event 230c for both user 220a and user 220c. Both influence scores may be greater than the threshold score. The social-networking system may thus send 240c a content object associated with the user 220a to the user 220c. The social-networking system may also send 240d a content object associated with the entity 220d to the user 220a. Here, the user 220c acts as a relay for the entity 220d. The content object associated with the entity 220d is send to the user 220a because the user 220c had a proximity event 230a with the entity 220d before having a proximity event 230c with the user 220a. Finally, the social-networking system may detect a proximity event 230d involving the user 220a and the user 220b between $T_7$ and $T_8$ and calculate an influence score of this proximity event 230d for the user 220b. As illustrated by FIG. 2, the proximity event 230d is after another proximity event 230b between the user 220a and the user 220b and has a longer duration than the proximity event 230b. Given this changed condition, although the influence score calculated the user 220b based on the proximity event 230b is smaller than the threshold score, the influence score calculated for the user 220b based on the proximity event 230d may be greater than the threshold score. The social-networking system may send 240e a content object associated with the entity 220d to the user 220b. Here, the users 220a and 220c act as relays for the entity 220d. The content object associated with the entity 220d is sent to the user 220b because the user 220c had a proximity event 230a with the entity 220d, the user 220a had a proximity event 230c with the user 220c, and the user 220b had a proximity event 230d with the user 220a. Although FIG. 2 illustrates a particular timeline comprising particular events, this disclosure contemplates any suitable timeline comprising any suitable events.

Figure 3:
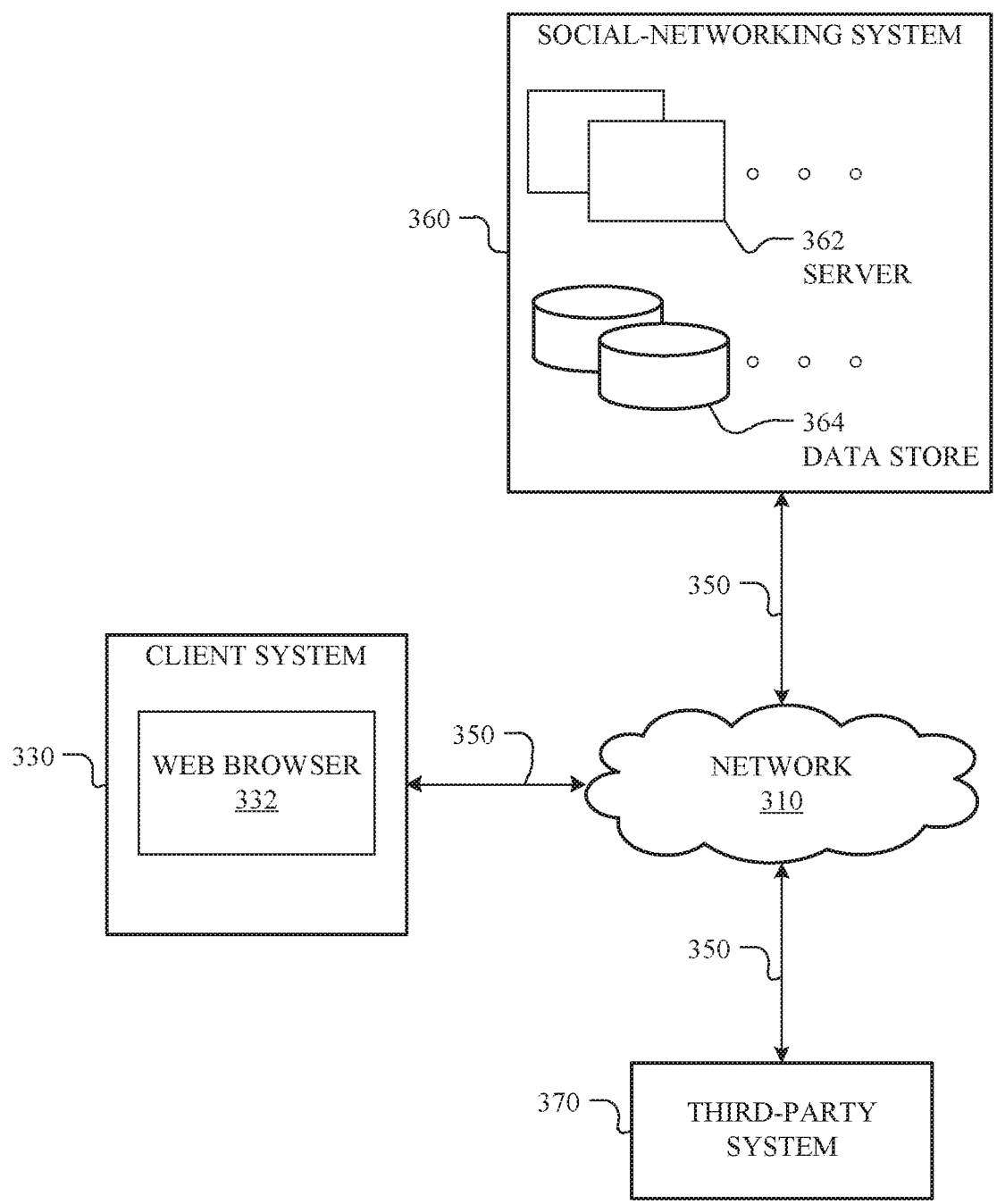
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
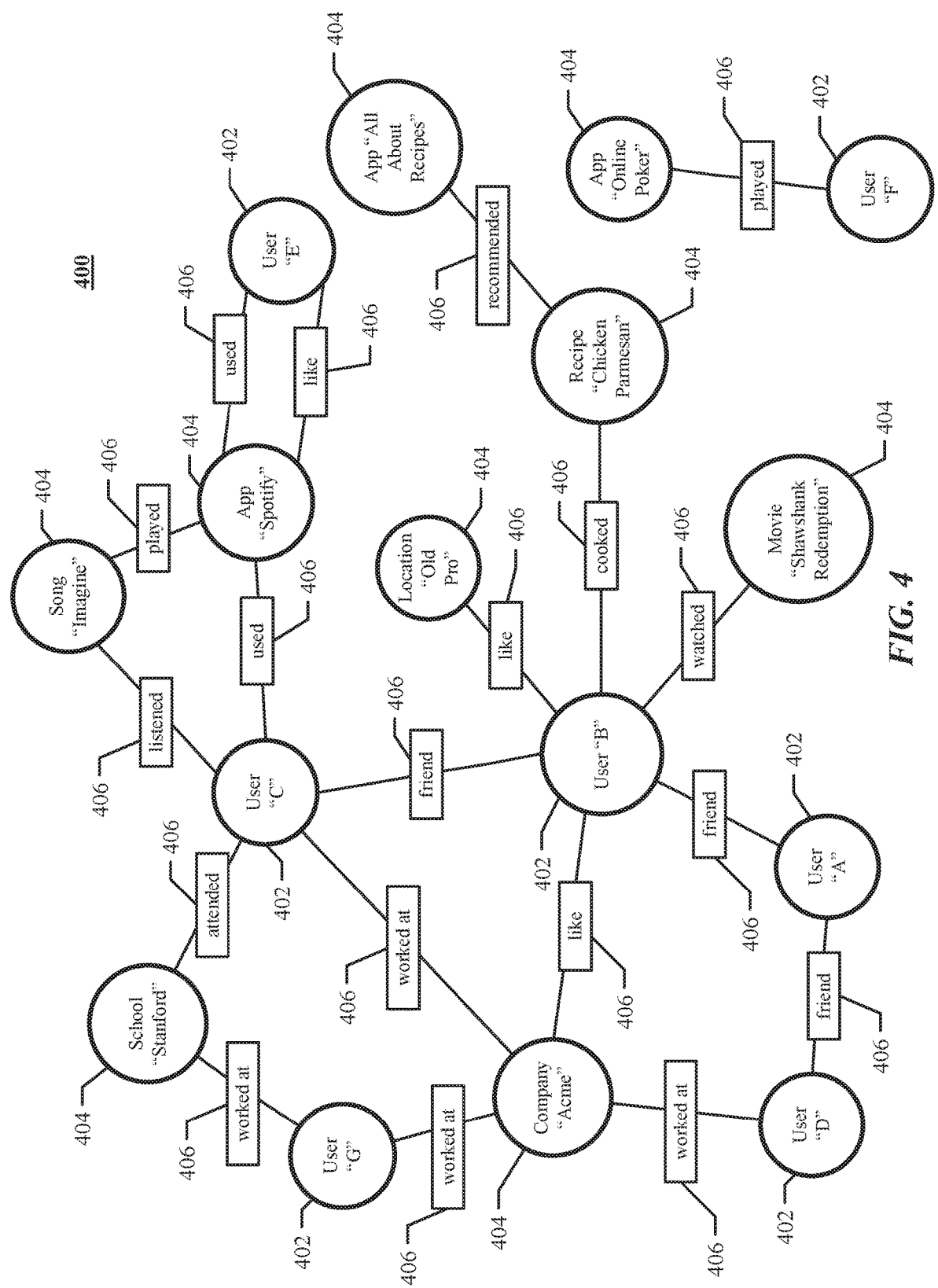
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 360). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 360. In addition or as an alternative, the social action may be promoted outside or off of social-networking system 360, where appropriate. In particular embodiments, a page may be an on-line presence (such as a webpage or website within or outside of social-networking system 360) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 360. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 360) or RSVP (e.g., through social-networking system 360) to an event associated with the advertisement. In addition or as an alternative, an advertisement may include social-networking-system content directed to the user. For example, an advertisement may display information about a friend of the user within social-networking system 360 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 360 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 360.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 360 to identify those users. In addition or as an alternative, social-networking system 360 may use user-profile information in social-networking system 360 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 360, off or outside of social-networking system 360, or on mobile computing devices of users. When on or within social-networking system 360, such targeting may be directed to users' news feeds, search results, e-mail or other in-boxes, or notifications channels or may appear in particular area of web pages of social-networking system 360, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 360, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 360 or explicit connections of a user to a node, object, entity, brand, or page on social-networking system 360. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information.

Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 362 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
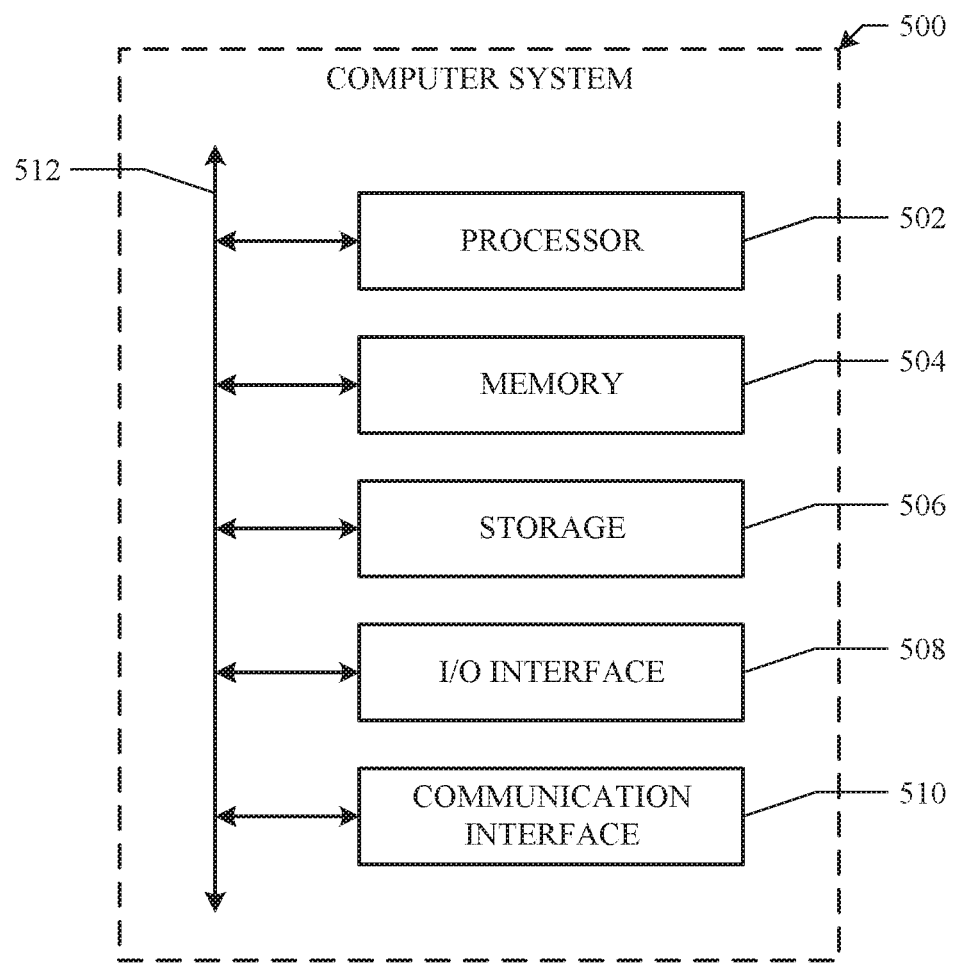
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more computing devices associated with a social-networking system, detecting a proximity event associated with a first user and a second user, wherein the proximity event comprises the second user being in geographic proximity to the first user;
by the one or more computing devices, calculating an influence score associated with the proximity event, wherein the influence score is based at least in part on:
a duration of the proximity event; and
a social gravity of the second user, wherein the social gravity of the second user is based at least in part on:
a count of third users who are connected to the second user on the social-networking system;
a history of interactions between the second user and one or more of the third users; or
a history of observations of a profile associated with the second user by one or more of the third users;
by the one or more computing devices, upon determining that the influence score is greater than a threshold score, identifying, based at least in part on a geographic location of the first user, a content object associated with the second user for provision to the first user; and
by the one or more computing devices, sending the content object to a client system associated with the first user for display.

2. The method of claim 1, further comprising:
determining an intent of the first user; and
identifying the content object based at least in part on the intent.

3. The method of claim 1, wherein the content object was created by an entity associated with the social-networking system, and wherein the second user was in geographic proximity to a physical location of the entity prior to the proximity event.

4. The method of claim 3, wherein a node corresponding to the entity in a social graph associated with the social-networking system is connected to a node corresponding to the second user by an edge.

5. The method of claim 1, wherein the influence score is further based at least in part on:
an affinity coefficient between the first user and the second user;
a similarity between the first user and the second user;
a frequency of one or more prior proximity events associated with the first user and the second user; or
a conversion rate associated with one or more prior proximity events associated with the first user and the second user.

6. The method of claim 1, further comprising:
identifying one or more third users in geographic proximity to the first user;
analyzing a mobility pattern of the third users to identify a hotspot location; and
sending a content object associated with the hotspot location to the client system associated with the first user for display.

7. The method of claim 1, wherein the content object comprises one or more of: a profile page, a post, a news story, an instant message, a chat room conversation, an email, an advertisement, a picture, a video, or an audio item.

8. One or more computer-readable non-transitory storage media associated with a social-networking system embodying software that is operable when executed by a computing system to:
detect a proximity event associated with a first user and a second user, wherein the proximity event comprises the second user being in geographic proximity to the first user;
calculate an influence score associated with the proximity event, wherein the influence score is based at least in part on:
a duration of the proximity event; and
a social gravity of the second user, wherein the social gravity of the second user is based at least in part on:
a count of third users who are connected to the second user on the social-networking system;
a history of interactions between the second user and one or more of the third users; or
a history of observations of a profile associated with the second user by one or more of the third users;
upon determining that the influence score is greater than a threshold score, identify, based at least in part on a geographic location of the first user, a content object associated with the second user for provision to the first user; and
send the content object to a client system associated with the first user for display.

9. The one or more computer-readable non-transitory storage media of claim 8, wherein the software is further operable when executed to:
determine an intent of the first user; and
identify the content object based at least in part on the intent.

10. The one or more computer-readable non-transitory storage media of claim 8, wherein the content object was created by an entity associated with the social-networking system, and wherein the second user was in geographic proximity to a physical location of the entity prior to the proximity event.

11. The one or more computer-readable non-transitory storage media of claim 10, wherein a node corresponding to the entity in a social graph associated with the social-networking system is connected to a node corresponding to the second user by an edge.

12. The one or more computer-readable non-transitory storage media of claim 8, wherein the influence score is further based at least in part on:
   an affinity coefficient between the first user and the second user;
   a similarity between the first user and the second user;
   a frequency of one or more prior proximity events associated with the first user and the second user; or
   a conversion rate associated with one or more prior proximity events associated with the first user and the second user.

13. The one or more computer-readable non-transitory storage media of claim 8, wherein the software is further operable when executed to:
   identify one or more third users in geographic proximity to the first user;
   analyze a mobility pattern of the third users to identify a hotspot location; and
   send a content object associated with the hotspot location to the client system associated with the first user for display.

14. The one or more computer-readable non-transitory storage media of claim 8, wherein the content object comprises one or more of: a profile page, a post, a news story, an instant message, a chat room conversation, an email, an advertisement, a picture, a video, or an audio item.

15. A system associated with a social-networking system comprising:
   one or more processors; and
   one or more computer-readable non-transitory storage media coupled to the one or more processors and comprising instructions operable when executed by one or more of the processors to cause the system to:
      detect a proximity event associated with a first user and a second user, wherein the proximity event comprises the second user being in geographic proximity to the first user;
      calculate an influence score associated with the proximity event, wherein the influence score is based at least in part on:
         a duration of the proximity event; and
         a social gravity of the second user, wherein the social gravity of the second user is based at least in part on:
            a count of third users who are connected to the second user on the social-networking system;
            a history of interactions between the second user and one or more of the third users; or
            a history of observations of a profile associated with the second user by one or more of the third users;
      upon determining that the influence score is greater than a threshold score, identify, based at least in part on a geographic location of the first user, a content object associated with the second user for provision to the first user; and
      send the content object to a client system associated with the first user for display.

16. The system of claim 15, wherein the processors are further operable when executing the instructions to:
   determine an intent of the first user; and
   identify the content object based at least in part on the intent.

17. The system of claim 15, wherein the content object was created by an entity associated with the social-networking system, and wherein the second user was in geographic proximity to a physical location of the entity prior to the proximity event.

18. The system of claim 17, wherein a node corresponding to the entity in a social graph associated with the social-networking system is connected to a node corresponding to the second user by an edge.

19. The system of claim 15, wherein the influence score is further based at least in part on:
   an affinity coefficient between the first user and the second user;
   a similarity between the first user and the second user;
   a frequency of one or more prior proximity events associated with the first user and the second user; or
   a conversion rate associated with one or more prior proximity events associated with the first user and the second user.

20. The system of claim 15, wherein the content object comprises one or more of:
   a profile page, a post, a news story, an instant message, a chat room conversation, an email, an advertisement, a picture, a video, or an audio item.

* * * * *